(12) United States Patent
Hart

(10) Patent No.: US 6,510,436 B1
(45) Date of Patent: Jan. 21, 2003

(54) SYSTEM AND METHOD FOR CLUSTERING LARGE LISTS INTO OPTIMAL SEGMENTS

(75) Inventor: David G. Hart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,200

(22) Filed: Mar. 9, 2000

(51) Int. Cl.[7] .............................................. G06F 17/30
(52) U.S. Cl. ...................................................... 707/102
(58) Field of Search ................................ 707/3, 4, 102; 706/15, 16; 704/232

(56) References Cited

U.S. PATENT DOCUMENTS

| | | | | |
|---|---|---|---|---|
| 5,267,146 A | * | 11/1993 | Shimizu et al. ................. 703/1 |
| 5,706,497 A | * | 1/1998 | Takahashi et al. .............. 707/5 |
| 5,832,182 A | * | 11/1998 | Zhang et al. ................ 382/226 |
| 5,832,525 A | * | 11/1998 | Wong et al. ................... 360/48 |
| 5,890,168 A | * | 3/1999 | Lawerman .................. 707/200 |
| 6,026,388 A | * | 2/2000 | Liddy et al. ..................... 704/9 |
| 6,167,397 A | * | 12/2000 | Jacobson et al. ............... 707/5 |
| 6,269,368 B1 | * | 7/2001 | Diamond ......................... 707/3 |
| 2001/0023419 A1 | * | 9/2001 | Lapointe et al. .............. 706/15 |

* cited by examiner

*Primary Examiner*—Wayne Amsbury
*Assistant Examiner*—Sana Al-Hashemi
(74) *Attorney, Agent, or Firm*—Joseph T. Van Leeuwen; Leslie A. Van Leeuwen

(57) ABSTRACT

A system and method for clustering data from a server computer and sent to a client computer. The server computer obtains a requested cluster size for the client computer. The requested cluster size includes the optimal size cluster the client computer can handle and the largest manageable cluster size that can be handled by the client. Fuzzy logic computations are performed on the data to determine an optimal cluster size and an optimal point at which to split the data for the particular client. Part of the cluster computations are based upon the affinity of individual data items to adjacent data items in the clustered list. The server computer also checks the affinity between the item with the largest score and the first item in the next cluster. If this affinity is higher than other affinity scores within the cluster, the cluster split is moved accordingly. Once an optimal cluster is determined, the data is transmitted from the server computer to the client computer.

24 Claims, 6 Drawing Sheets

SYSTEM AND METHOD FOR CLUSTERING LARGE LISTS INTO OPTIMAL SEGMENTS

BACKGROUND

1. Field of the Invention

The present invention relates to information processing technology. More particularly, the present invention relates to a system and method for clustering large lists of information into optimal segments for human-computer interfaces using fuzzy logic.

2. Description of the Related Art

In client-server applications, the end user is often presented with lists of items from which to make choices or selections. Presenting an end user with a list of items from which to select introduces fewer errors into the system than relying on the end user to enter the information manually using the keyboard. However, allowing the user to select from a list of items becomes untenable when the list of items from which the user is selecting becomes extremely large. The point at which the list is untenable depends on various factors including the size of the user's display screen and the speed at which the data can be transmitted from the server to the client's workstation. For example, a list of 30 items may be very manageable on a 19" display with 1024×768 pixel resolution, but that same list is untenable on a 14" display with only 320×200 pixel resolution.

In the field of systems and network management, it is common to have lists of items consisting of thousands or tens of thousands of items. Traditional techniques for clustering these long lists rely on some characteristic or attribute of the item being displayed that can also be used for building the clustered list. For example, a long list of names could be clustered by their DNS hierarchy. A challenge arises, however, when the list is not evenly distributed across the characteristic or attribute used for clustering. Another challenge of the traditional method is that it often requires the end user to understand more information about the item that he or she wishes to select than is desirable.

SUMMARY

It has been discovered that large lists of items can be grouped into clusters so that the items in a given cluster are a manageable size and the affinity between the last item of one cluster and the first item of the second cluster is reduced and the affinity of items within a cluster is accordingly maximized. The client may differ in terms of its display size and its connectivity to the server. Based on these factors, an optimal list size is determined that can optimally be sent to the client computer and displayed on the client's display device. In addition, a maximum manageable list size is determined to provide a maximum list size that can reasonably be handled by the client given the client's connectivity to the server and the client's display size.

The clustering of list data is performed by determining several "fuzzy" scores. These fuzzy scores include the affinity of list items to one another, whether the list size is about equal to the optimal size that can be handled by the client, and whether the list size is less than or about equal to the maximum list size that can be handled by the client. A total score is determined using the aforementioned fuzzy scores. The optimal cluster size is determined by first selecting the cluster based upon the item that receives the highest total score followed by performing an affinity test to determine if the cluster size should be modified due to data list items having a greater affinity score than the affinity score for the item first selected based upon total score.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawing indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
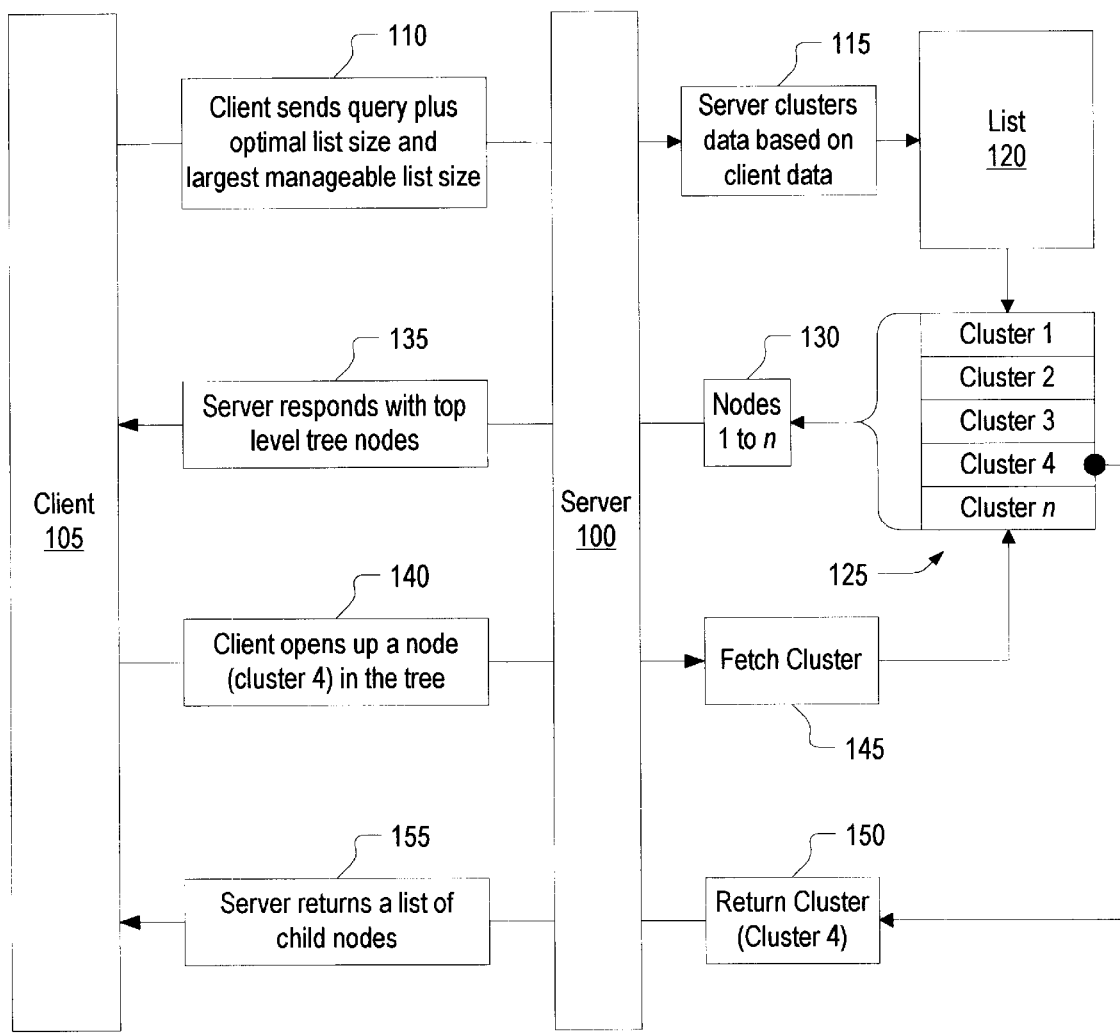
FIG. 1 is a system diagram showing the interaction between a client and server returning a list cluster.

FIG. 1 shows a system diagram wherein server 100 receives requests from client 105. First, client 105 sends request 110 to server 100 in order to receive data that can be used in a to pull-down window or other type of selectable list by a user using client computer 105. Request 110 includes the query of data client 105 is requesting from server 100, the optimal list size that can be handled by client 105, and the largest manageable list size that can be handled by client 105. The optimal list size and largest manageable list size are determined by considering the connection between client 105 and server 100 as well as the display size of the display unit connected to client 105. Some network connections, such as telephone based modems, are slower than other network connections, such as local area network (LAN) connections, T1 connections, ISDN connections, or cable modem connections. In addition, the transmission throughput between client 105 and server 100 may be impeded by other factors such as network traffic and hardware problems on either client 105 or server 100. If the connection between client 105 and server 100 is slower, smaller cluster sizes are sent from server 100 to client 105 to lessen the impact of the time needed to transmit data packets. On the other hand, if the connection between client 105 and server 100 is fast, larger amounts of data can be sent from server 100 to client 105 because the user is not likely to have to wait a long amount of time to receive and view the data list. In addition, the specific display being used by client 105 is considered to determine the optimal list size and the largest manageable list size. If client 105 is a palm-based system, smaller amounts of data can be easily viewed by the user than if client 105 includes a large screen display. Furthermore, the resolution of the display device is considered for determining the optimal list size and largest manageable fib list size. If the resolution of one 15-inch display device is 1024 pixels by 768 pixels, while another 15-inch display device can only support 640 pixels by 480 pixel resolution, the first display can handle more list items than the second display device and, thus, the optimal list size and largest manageable list size for the first display would be greater. In the embodiment shown, the optimal list size and largest manageable list size are determined by client 105. However, the optimal list size and largest manageable list size could also be determined by server 100 after receiving or storing information about client 105. For example, in a closed-network, such as a corporate intranet, server 100 may be configured with information about the client computers that access it. With this information, server 100 could determine the optimal list size and largest manageable list size based upon the known display size and resolution of client 105 and the current network condition, which can be determined by sending test signals between client 105 and server 100 to determine the throughput in kilobits per second between the two machines.

Once request 110 is received by server 100, the data is clustered by clustering routine 115 that clusters list 120 into manageable cluster sizes. Clustered list 125 is the same as list 120, however in clustered list 125 breakpoints have been determined separating clustered list 125 into one or more clusters depending upon the optimal list size and largest manageable list size that can be handled by client 105. While clustered list 125 is shown as a separate list for clarity, one embodiment forms clustered list 125 by storing pointers of the breakpoints forming the various clusters with the pointers pointing to list items contained in list 120. Clustered list 125 is shown as including n clusters. If the number of clusters exceeds the largest manageable list size that can be handled by client 105, then the cluster list is clustered into further high-level cluster groups. These cluster groups can be iteratively clustered into further higher level cluster lists until a cluster group is attained that does not exceed the largest manageable list size that can be handled by client 105. Node list 130 includes identifiable characteristics of the associated clusters. For example, if list 120 contained an alphabetical listing of names, the clusters may be divided based on the letter of the alphabet with which the items in the corresponding cluster begins, i.e., "Aaron to Azman", "Backer to Byron", "Cabot to Cymer", "Dabney to Dyson", etc. These cluster dividing points are returned to the user to provide a meaningful cluster selection. If the user is looking for someone with the last name of "Doyle" he or she would know to select the "Dabney to Dyson" cluster. In one embodiment, node list 130 also includes the logical instructions needed to retrieve the corresponding data. For the examples cited above, the logical instructions would be "item<B", "B<=item<C", "C<=item<D", "D<=item<E", etc. Because the logical instructions may be more difficult for human readers to decipher, the logical instructions can be returned to client 105 as hidden text. At response 135, server 100 returns the information from node list 130 to client 105 for use by the user.

Client 105 receives response 135 and presents the cluster list to the user in a textual selection list, such as a pull down menu, combo box, list box, or the like. In the example above, the user was interested in finding information about a user named "Doyle" so the user would select the "Dabney to Dyson" cluster. By opening up the "D" (the fourth) cluster, client 105 sends open instruction 140 to server 100 requesting that data for the fourth cluster. Server 100 in turn performs fetch cluster 145 to fetch the fourth cluster from clustered list 125. Fetch cluster 145 retrieves the fourth cluster from node list 130. Including logical instructions for the data as described above allows server 100 to quickly fetch the requested cluster. In the example, list data for cluster 4 is fetched and return cluster 150 returns cluster from server 100 to client 105. The list of child nodes is returned to client 105 from server 100 in return list 155.

Figure 2:
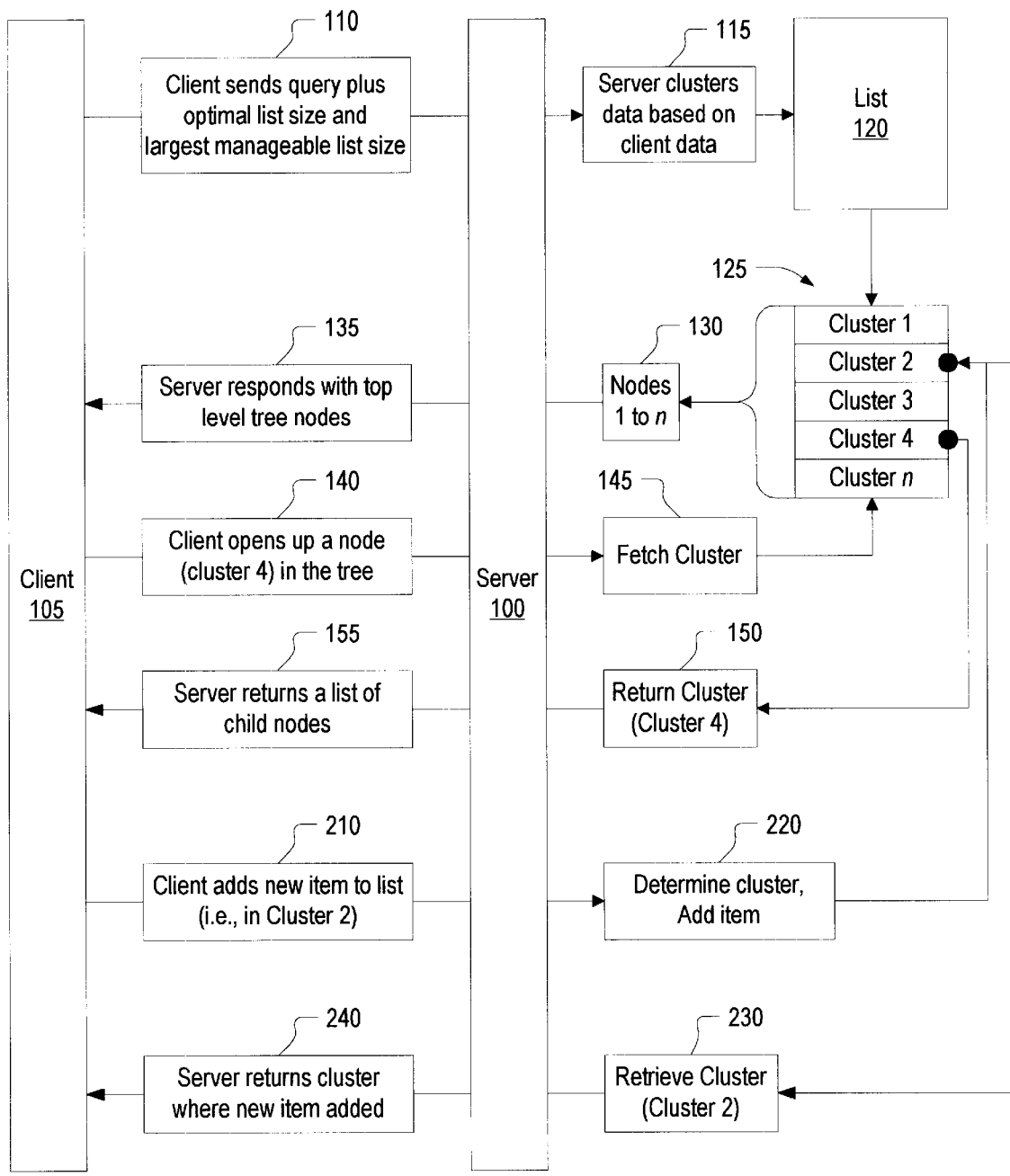
FIG. 2 is a system diagram showing the interaction between a client and server when adding a list item.

FIG. 2 shows how client 105 can, in addition to fetching list data, add a list item to list 120. For example, if client 105 wishes to add a new person named "Bohr" in the example data outlined above, server 100 would determine in which cluster "Bohr" was located by processing the logical rule that was determined for the various clusters in node list 130 is used to quickly determine the location of the item to be added to the list and reduces the degradation of the clustering performed by clustering routine 115 stored in cluster list 125. In one embodiment, the logical rules are passed as hidden text from server 100 to client 105 and subsequently returned to server 100 when client 105 requests to add a new item to the list at add request 210. In another embodiment, the logical rules corresponding to the clusters are stored on server 100 and retrieved when an add request is received at server 100. Because multiple users may be using the system simultaneously, multiple versions of cluster list 125 and node list 130 preferably coexist. The reason multiple versions of clustered list 125 and node list 130 are preferable (rather than a single version) is due to the various optimal sizes and largest implementation sizes that are received from multiple users. A caching algorithm could be employed by clustering function 115 so that multiple clustered lists 125 are not created for users requesting the same list with similar display and connectivity attributes (i.e., the same optimal list sizes and largest manageable list sizes). Once add request 210 is received by server 100, add item function 220 determines into which cluster the new item is to be added. Because add item function 220 adds the item based upon the logical rules established during clustering function 115, only minor degradations occur to the quality of clustered list 125 as result of the new item being added. In this example, the user requested to add the name "Bohr" to the list. Add item function 220 determined that the logical rule "B<=item<C" applied to the name "Bohr" and the corresponding cluster from clustered list 125 was Cluster 2. The new name ("Bohr") is added to Cluster 2. Next, retrieve cluster function 230 retrieves cluster 2 from clustered list 125. At this point, cluster 2 includes the new name ("Bohr") added to the list. Server 100 performs return cluster function 240 returning cluster 2, including the newly added data item, to client 105. Because the optimal cluster size is less than the largest manageable cluster size, new items can be added to the cluster without needing to re-cluster list 120. After numerous additions (or deletions) are made to list 120, re-clustering list 120 may be needed to reestablish optimal cluster sizes.

Figure 3:
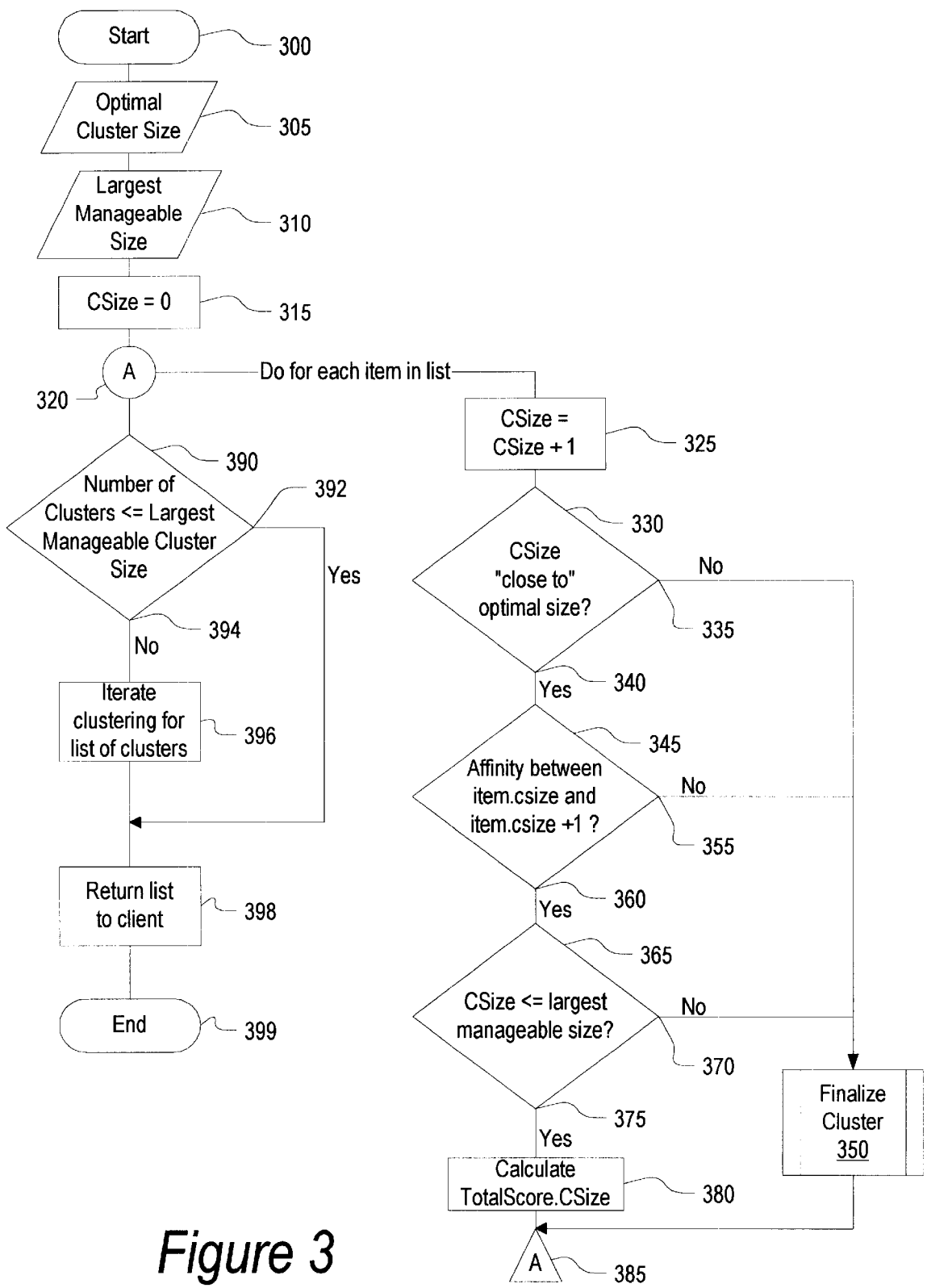
FIG. 3 is a flowchart showing one embodiment of determining cluster sizes.

FIG. 3 shows a flowchart depicting how the server clusters the fuzzy data list. Cluster size data is data relating to the cut-off point for a cluster and includes the data shown in the various columns in Tables 1 and 2, below (i.e., Cluster Size, Is just before, Affinity, About Equal to Optimal Size, and Less Than Or About Equal To Maximum Manageable Size values). The cluster size data is used to compute the Total Score value that is used to determine the end of one cluster and the beginning of the next cluster. Processing is initiated at step 300. Next, the optimal cluster size is received as input (step 305) and the largest manageable cluster size is received as input (step 310). As was previously described, the optimal cluster size and largest manageable cluster size are determined by the display size and resolution of the client computer and the connectivity throughput between the client and server over the network. The cluster size is initialized to zero (step 315), after which a loop is entered to process each item in the list (step 320). Next, the cluster size is incremented (step 325). A fuzzy decision is next made to compare the current cluster size (incremented in step 325) to the optimal list size that can be handled by the client (step 330). If the current cluster size is not "close to" the optimal list size, "no" branch 335 is taken to finalize cluster processing (step 350). For details of finalize cluster processing (step 350), see FIG. 4. On the other hand, if the current cluster size is "close to" the optimal list size, "yes" branch 340 is taken leading to further decisions. Following "yes" branch 340, the next decision (step 345) is whether there is affinity between the current list item and the next list item. If there is no affinity, "no" branch 355 is taken to finalize cluster processing (step 350). On the other hand, if there is affinity between the current list item and the next list item, "yes" branch 360 is taken. Finally, the cluster size is compared with the largest manageable list size (step 365). If the cluster size is greater than the largest manageable list size, "no" branch 370 is taken leading to finalize cluster process (step 350). If the current cluster size is less than or equal to the largest manageable cluster size, "yes" branch 375 is taken. "Yes" branch 375 leads to calculate total score for this cluster item (step 380). The total score is calculated by multiplying the affinity score, the "close to" optimal size score, and the less than or about equal to the largest manageable size score.

An embodiment of calculating the affinity score, "close to" optimal size score, and less than or about equal to the largest manageable size score is described below along with sample clustering data. After the total score has been calculated (at step 380), the loop reiterates (step 385) and processing begins for the next item in the list at the top of the loop (step 320). After all list items have been processed by loop beginning with step 320, the total number of clusters for the list is compared with the largest manageable cluster size that can be handled by the client (step 390). If the number of clusters is less than or equal to the largest manageable cluster size, "yes" branch 392 is taken bypassing further clusterization. However, if the number of clusters resulting from the loop beginning with step 320, then "no" branch 394 is taken and the loop is recursively processed (step 396) for the list of clusters until a high-level cluster is achieved that is less than or equal to the largest manageable cluster size. For example, if a dictionary of several thousand words was being clustered and the largest manageable cluster size was 50, the low-level nodes would contain less than or equal to 50 words. Because the number of clusters would also be greater than the largest manageable cluster size, the cluster lists themselves would be further clustered until the highest level cluster is found. In the example outlined above, the highest level cluster may be "A", "B", "C", . . . "Z". When the user clicks on the letter, the next level cluster would appear (i.e., "AA", "AB", "AC", . . . "AZ") and this process would continue until the lowest level clusters are displayed. Once all items have been clustered and cluster lists have been also clustered, if needed, processing terminates at step 399.

Figure 4:
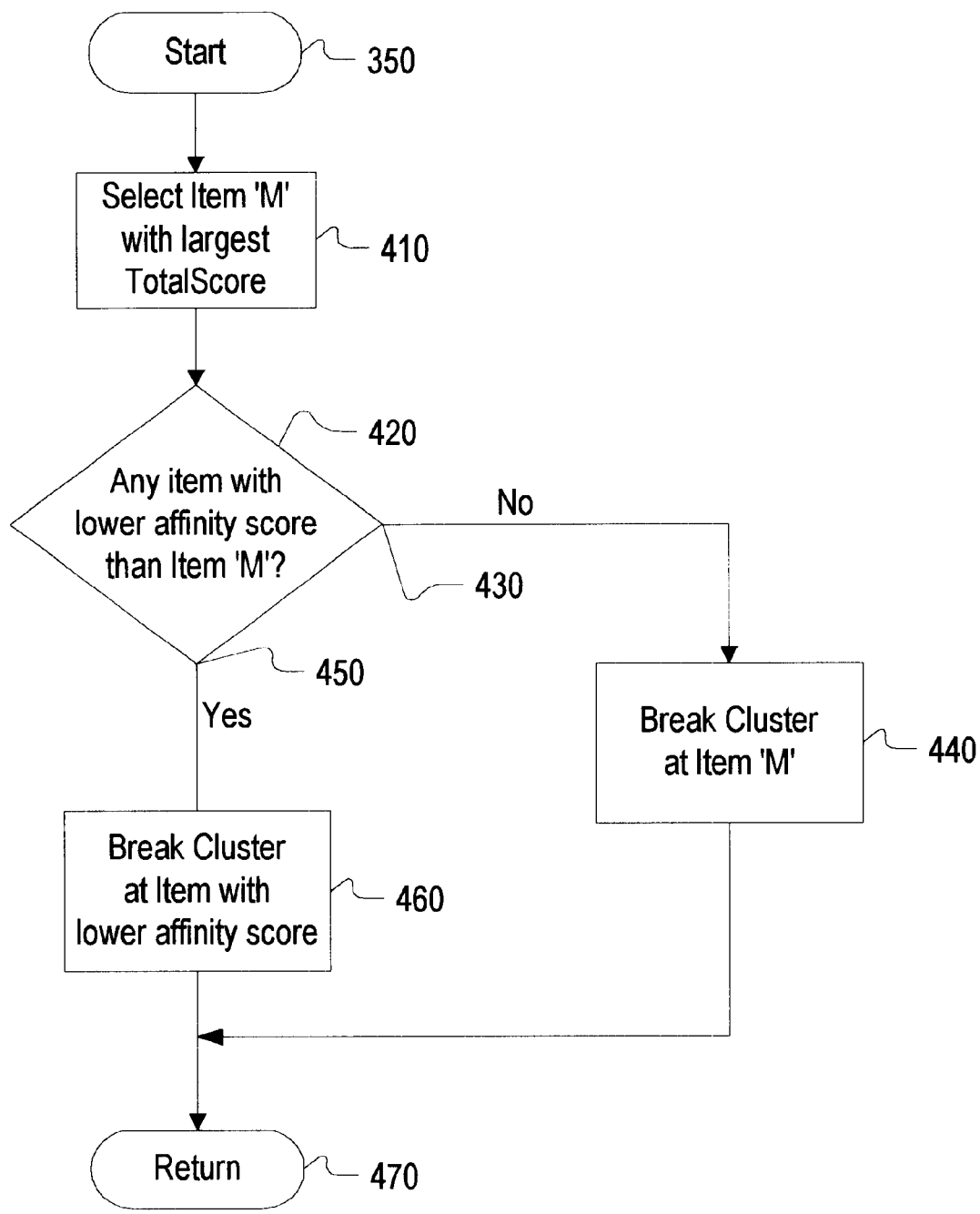
FIG. 4 is a subroutine flowchart for finalizing the cluster size selection.

Turning now to FIG. 4, this flowchart shows the processing of the external process from FIG. 3 that finalizes the individual clusters (see step 350 on FIG. 3). Once a condition occurs that signals the end of a particular cluster (either the cluster size being "close to" the optimal size (see step 330 on FIG. 3), no affinity existing between the last cluster item and the next item in the list (see step 345 on FIG. 3), or the cluster size being larger than the largest manageable size (see step 365 on FIG. 3), the current cluster is closed and a new cluster is started. In order to close the current cluster, finalize cluster processing commences (step 350) and the item within the current cluster is selected with the greatest total score (calculated in step 380 from FIG. 3). Most of the time, the item with the greatest total score will be the last item of the current cluster and the next item in the list will begin the next. cluster. However, if the affinity score between the item with the greatest total score happens to be greater than one of the other items in the cluster, the end of the cluster is moved so that the item with the lower affinity score becomes the last item in the cluster. As an example, the following sample of host names shows why moving the cluster break point sometimes makes sense:

TABLE 1

| Item | Cluster size | Is just before | Affinity | IsAboutEqual Optimal Size | Is Less Than OR About EqualTo Largest Manageable Size | Total Score |
| --- | --- | --- | --- | --- | --- | --- |
| dw3.tivoli.com | 1 | 0.67 | 0.33 | 0.04 | 1.00 | 0.01 |
| dwakashi.dev.tivoli.com | 2 | 0.75 | 0.25 | 0.08 | 1.00 | 0.02 |
| dwaltman.dev.tivoli.com | 3 | 0.67 | 0.33 | 0.12 | 1.00 | 0.04 |
| dwidow.dev.tivoli.com | 4 | 0.75 | 0.25 | 0.16 | 1.00 | 0.04 |
| dwilkins.dev.tivoli.com | 5 | 0.83 | 0.17 | 0.20 | 1.00 | 0.03 |
| dwills.dev.tivoli.com | 6 | 0.75 | 0.25 | 0.24 | 1.00 | 0.06 |
| dwise.dev.tivoli.com | 7 | 0.50 | 0.50 | 0.28 | 1.00 | 0.14 |
| dyang.dev.tivoli.com | 8 | 0.86 | 0.14 | 0.32 | 1.00 | 0.04 |
| dyang2.dev.tivoli.com | 9 | 0.67 | 0.33 | 0.36 | 1.00 | 0.12 |
| dyounis1.dev.tivoli.com | 10 | 0.00 | 1.00 | 0.40 | 1.00 | 0.40 |
| eagle.dev.tivoli.com | 11 | 0.67 | 0.33 | 0.44 | 1.00 | 0.15 |
| eamon.dev.tivoli.com | 12 | 0.67 | 0.33 | 0.48 | 1.00 | 0.16 |
| earth.dev.tivoli.com | 13 | 0.50 | 0.50 | 0.52 | 1.00 | 0.26 |
| ebagley.training.tivoli.com | 14 | 0.50 | 0.50 | 0.56 | 1.00 | 0.28 |
| ecarrie.dev.tivoli.com | 15 | 0.50 | 0.50 | 0.60 | 1.00 | 0.30 |
| eddie.dev.tivoli.com | 16 | 0.67 | 0.33 | 0.64 | 1.00 | 0.21 |
| edenor-msio.dev.tivoli.com | 17 | 1.00 | 0.00 | 0.68 | 1.00 | 0.00 |
| edenor-sftiii.dev.tivoli.com | 18 | 1.00 | 0.00 | 0.72 | 1.00 | 0.00 |
| edenor1.dev.tivoli.com | 19 | 1.00 | 0.00 | 0.76 | 1.00 | 0.00 |

TABLE 1-continued

| Item | Cluster size | Is just before | Affinity | IsAboutEqual Optimal Size | Is Less Than OR About EqualTo Largest Manageable Size | Total Score |
|---|---|---|---|---|---|---|
| edenor2.dev.tivoli.com | 20 | 0.50 | 0.50 | 0.80 | 1.00 | 0.40 |
| eel.dev.tivoli.com | 21 | 0.67 | 0.33 | 0.84 | 1.00 | 0.28 |
| eemejul1.dev.tivoli.com | 22 | 0.50 | 0.50 | 0.88 | 1.00 | 0.44 |
| efollis.dev.tivoli.com | 23 | 0.67 | 0.33 | 0.92 | 1.00 | 0.30 |
| efran.dev.tivoli.com | 24 | 0.75 | 0.25 | 0.96 | 1.00 | 0.24 |
| efron-nt.dev.tivoli.com | 25 | 0.86 | 0.14 | 1.00 | 1.00 | 0.14 |
| efron.dev.tivoli.com | 26 | 0.50 | 0.50 | 1.00 | 1.00 | 0.50 |
| eggflip.dev.tivoli.com | 27 | 0.50 | 0.50 | 1.00 | 1.00 | 0.50 |
| ehalliday.dev.tivoli.com | 28 | 0.50 | 0.50 | 1.00 | 1.00 | 0.50 |
| eilbott.dev.tivoli.com | 29 | 0.67 | 0.33 | 1.00 | 1.00 | 0.33 |
| einstein.dev.tivoli.com | 30 | 0.50 | 0.50 | 1.00 | 1.00 | 0.50 |
| ekartzma.dev.tivoli.com | 31 | 0.67 | 0.33 | 1.00 | 1.00 | 0.33 |
| ekulchak.training.tivoli.com | 32 | 0.50 | 0.50 | 1.00 | 1.00 | 0.50 |
| el-guardo.dev.tivoli.com | 33 | 0.67 | 0.33 | 1.00 | 1.00 | 0.33 |
| eliu.dev.tivoli.com | 34 | 0.67 | 0.33 | 1.00 | 1.00 | 0.33 |
| elm.dev.tivoli.com | 35 | 0.75 | 0.25 | 1.00 | 1.00 | 0.25 |
| elmo.dev.tivoli.com | 36 | 0.67 | 0.33 | 0.96 | 1.00 | 0.32 |
| elvis.dev.tivoli.com | 37 | 0.50 | 0.50 | 0.92 | 1.00 | 0.46 |
| enceladus.dev.tivoli.com | 38 | 0.67 | 0.33 | 0.88 | 1.00 | 0.29 |
| engulf.dev.tivoli.com | 39 | 0.67 | 0.33 | 0.84 | 1.00 | 0.28 |
| enigma.dev.tivoli.com | 40 | 0.67 | 0.33 | 0.80 | 1.00 | 0.26 |
| ennuncio.dev.tivoli.com | 41 | 0.67 | 0.33 | 0.76 | 1.00 | 0.25 |
| enterprise.dev.tivoli.com | 42 | 0.50 | 0.50 | 0.72 | 1.00 | 0.36 |
| eofenste.dev.tivoli.com | 43 | 0.67 | 0.33 | 0.68 | 1.00 | 0.22 |
| eoliver-nt.dev.tivoli.com | 44 | 1.00 | 0.00 | 0.64 | 1.00 | 0.00 |
| eoliver.dev.tivoli.com | 45 | 0.50 | 0.50 | 0.60 | 1.00 | 0.30 |
| epurzer.training.tivoli.com | 46 | 0.50 | 0.50 | 0.56 | 0.93 | 0.26 |
| equator.dev.tivoli.com | 47 | 0.50 | 0.50 | 0.52 | 0.87 | 0.23 |
| eratlif1.dev.tivoli.com | 48 | 1.00 | 0.00 | 0.48 | 0.80 | 0.00 |
| eratlif2.dev.tivoli.com | 49 | 0.67 | 0.33 | 0.44 | 0.73 | 0.11 |
| eridani.dev.tivoli.com | 50 | 0.67 | 0.33 | 0.40 | 0.67 | 0.09 |
| ernie.dev.tivoli.com | 51 | 0.67 | 0.33 | 0.36 | 0.60 | 0.07 |
| eros.dev.tivoli.com | 52 | 0.67 | 0.33 | 0.32 | 0.53 | 0.06 |
| ersmith.training.tivoli.com | 53 | 0.67 | 0.33 | 0.28 | 0.47 | 0.04 |
| erupt.dev.tivoli.com | 54 | 0.50 | 0.50 | 0.24 | 0.40 | 0.05 |
| esc-dev.dev.tivoli.com | 55 | 0.83 | 0.17 | 0.20 | 0.33 | 0.01 |
| esc-staging.dev.tivoli.com | 56 | 0.75 | 0.25 | 0.16 | 0.27 | 0.01 |
| escher.dev.tivoli.com | 57 | 0.75 | 0.25 | 0.12 | 0.20 | 0.01 |
| escort.dev.tivoli.com | 58 | 0.67 | 0.33 | 0.08 | 0.13 | 0.00 |
| esher.dev.tivoli.com | 59 | 0.50 | 0.50 | 0.04 | 0.07 | 0.00 |
| etch.dev.tivoli.com | 60 | 0.50 | 0.50 | 0.00 | 0.00 | 0.00 |

In Table 1, assume all words shown fall within the largest manageable cluster size for the current cluster. The item with the highest total score, "ekulchak.training.tivoli.com", falls right before the item "ekartzma.dev.tivoli.com", however, the item with the lowest affinity score, "dyounisl.dev.tivoli.com", falls right before the item "eagle-.dev.tivoli.com." It makes more sense to split the clusters in this spot to create a small cluster that is bounded by dw3.tivoli.com and dyounisl.dev.tivoli.com rather than to expand the size of the cluster so as to achieve the optimal score. Expanding the cluster to the optimal size would create an unnatural grouping of items (dw–ek) whereas the smaller cluster while being sub-optimal based on size is better optimized for usability (dw–e). Referring back to FIG. 4, if, as in the example above, any item in the cluster has a lower score than the item with the highest total score, decision (step 420) branches to "yes" branch 450 and proceeds to break cluster between the item with the lower affinity score and the item following such item (step 460). On the other hand, if no other item has a lower affinity score than the item with the highest total score, then decision 420 branches to "no" branch 430 and the cluster is broken between the item with the highest total score and the next item in the list (step 440). After one of the two cluster breaks has been made, processing ends at step 470.

Figure 5:
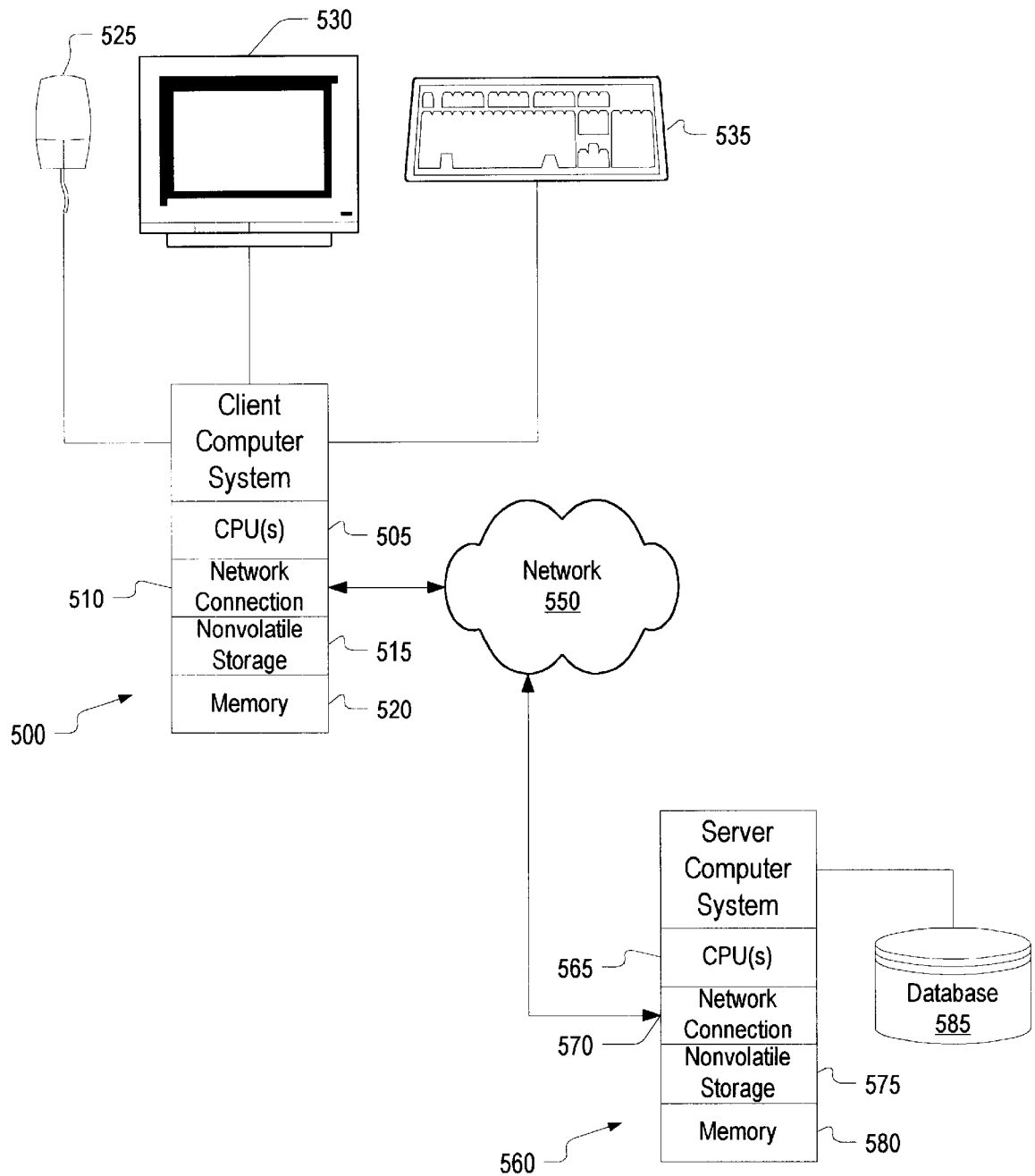
FIG. 5 is a system drawing of components of a client and server computer interacting through a network.

FIG. 5 shows components of systems used in a client-server system and method for clustering lists into optimal segments. Client system 500 is shown including one or more processors (505), network connection 510 for connecting to server 560, nonvolatile storage 515, and memory 520. Nonvolatile storage 515 includes nonvolatile memory that retains information when power to client computer 500 is turned off and may include magnetic storage media, such as a hard drive or floppy disk. Selecting device 525 is connected to client system 500 and is used for selecting information on graphical display 530. Selecting device 525 may include a mouse, trackball, track-point, track-pad, graphics tablet, or any device used by the user of client system 500 to select items from display 560. Display 530 is used for displaying data to the user of client system 500. Keyboard 535 is used for entry of data into client system 500. Client system 500 is connected to server system 560 via network 550. Network 550 includes the Internet, an intranet, a local area network (LAN) or wide area network (WAN), or the public switched telephone network (PSTN). Network connection varies depending upon the type of network being accessed by client system 500. For a LAN, a LAN card, such as an Ethernet or token-ring card are possible network connections. For the Internet, network connections include a modem, cable modem, ISDN card, DSL modem, or any component usable by client system 500 to connect to the Internet. For the public switched telephone network, a modem or ISDN line could be used to communicate with server system 560. Client system 500 also includes wired and wireless devices, such as palm-based computers and cellular telephones, that connect to networks via wired or wireless modems. Server system 560 includes one or more processors 565, network connection 570 similar to network connection used by client system 500, nonvolatile storage 575, and memory 580. Server system 560 accesses database 585 for information to send to client system 500. Database 585 may be stored on nonvolatile storage connected to server system 560 or may be accessible through a separate computer system that manages the database and executes database management software to receive and respond to requests for data from computers such as server computer 560.

Table 2 (shown below) illustrates a sample cluster following processing by the flowcharts shown in FIGS. 3 and 4. For the example shown in Table 2, the optimal list size the client can handle is 25, the amount of data the client can handle before the list becomes unwieldy is 40, and the largest manageable list size is 50.

TABLE 2

Sample Cluster

| (1) Item | (2) Cluster size | (3) Is just before | (4) Affinity (1-C) | (5) About Equal to Optimal Size | (6) Less Than Or About Equal To Max.Manageable Size | (7) Total Score |
|---|---|---|---|---|---|---|
| a | 1 | 0.50 | 0.50 | 0.05 | 1.00 | 0.03 |
| ability | 2 | 0.67 | 0.33 | 0.10 | 1.00 | 0.03 |
| able | 3 | 0.67 | 0.33 | 0.15 | 1.00 | 0.05 |
| about | 4 | 0.50 | 0.50 | 0.20 | 1.00 | 0.10 |
| across | 5 | 0.50 | 0.50 | 0.25 | 1.00 | 0.13 |
| address | 6 | 0.88 | 0.12 | 0.30 | 1.00 | 0.04 |
| addressability | 7 | 0.90 | 0.10 | 0.35 | 1.00 | 0.04 |
| addressable | 8 | 0.88 | 0.12 | 0.40 | 1.00 | 0.05 |
| addressed | 9 | 0.67 | 0.33 | 0.45 | 1.00 | 0.15 |
| advanced | 10 | 0.50 | 0.50 | 0.50 | 1.00 | 0.25 |
| agent | 11 | 0.83 | 0.17 | 0.55 | 1.00 | 0.09 |
| agent. | 12 | 0.50 | 0.50 | 0.60 | 1.00 | 0.30 |
| all | 13 | 0.75 | 0.25 | 0.65 | 1.00 | 0.16 |
| allow | 14 | 0.83 | 0.17 | 0.70 | 1.00 | 0.12 |
| allows | 15 | 0.67 | 0.33 | 0.75 | 1.00 | 0.25 |
| already | 16 | 0.67 | 0.33 | 0.80 | 1.00 | 0.26 |
| alternatively | 17 | 0.75 | 0.25 | 0.85 | 1.00 | 0.21 |
| although | 18 | 0.50 | 0.50 | 0.90 | 1.00 | 0.45 |
| an | 19 | 0.67 | 0.33 | 0.95 | 1.00 | 0.31 |
| and | 20 | 0.67 | 0.33 | 1.00 | 1.00 | 0.33 |
| announce | 21 | 0.67 | 0.33 | 1.00 | 1.00 | 0.33 |
| another | 22 | 0.67 | 0.33 | 1.00 | 1.00 | 0.33 |
| answer | 23 | 0.67 | 0.33 | 1.00 | 1.00 | 0.33 |
| any | 24 | 0.75 | 0.25 | 1.00 | 1.00 | 0.25 |
| anything | 25 | 0.75 | 0.25 | 1.00 | 1.00 | 0.25 |
| anywhere | 26 | 0.50 | 0.50 | 1.00 | 1.00 | 0.50 |
| API | 27 | 0.67 | 0.33 | 1.00 | 1.00 | 0.33 |
| application | 28 | 0.92 | 0.08 | 1.00 | 1.00 | 0.08 |
| applications | 29 | 0.80 | 0.20 | 1.00 | 1.00 | 0.20 |
| apply | 30 | 0.75 | 0.25 | 1.00 | 1.00 | 0.25 |
| approach | 31 | 0.50 | 0.50 | 0.95 | 1.00 | 0.48 |
| architecture | 32 | 0.92 | 0.08 | 0.90 | 1.00 | 0.07 |
| architecture. | 33 | 0.67 | 0.33 | 0.85 | 1.00 | 0.28 |
| are | 34 | 0.75 | 0.25 | 0.80 | 1.00 | 0.20 |
| areas | 35 | 0.67 | 0.33 | 0.75 | 1.00 | 0.25 |
| arrangements | 36 | 0.50 | 0.50 | 0.70 | 1.00 | 0.35 |
| as | 37 | 0.67 | 0.33 | 0.65 | 1.00 | 0.21 |
| aspects | 38 | 0.67 | 0.33 | 0.60 | 1.00 | 0.20 |
| associated | 39 | 0.75 | 0.25 | 0.55 | 1.00 | 0.14 |
| assumed | 40 | 0.86 | 0.14 | 0.50 | 1.00 | 0.07 |
| assumes | 41 | 0.67 | 0.33 | 0.45 | 1.00 | 0.15 |
| asynchronicity | 42 | 0.50 | 0.50 | 0.40 | 1.00 | 0.20 |
| at | 43 | 0.87 | 0.33 | 0.35 | 1.00 | 0.12 |
| attached | 44 | 0.50 | 0.50 | 0.30 | 1.00 | 0.15 |
| availability | 45 | 0.88 | 0.12 | 0.25 | 1.00 | 0.03 |
| available | 46 | 0.00 | 1.00 | 0.20 | 1.00 | 0.20 |
| back | 47 | 0.80 | 0.20 | 0.15 | 1.00 | 0.03 |
| backup | 48 | 0.67 | 0.33 | 0.10 | 1.00 | 0.03 |
| bandwidth | 49 | 0.67 | 0.33 | 0.05 | 1.00 | 0.02 |
| based | 50 | 0.67 | 0.33 | 0.00 | 1.00 | 0.00 |

Column 1 contains the item that is being clustered. Column 2 contains the current cluster size. Column 3 contains the "is just before" value that relates to the items affinity with the next item in the list. Depending upon the kind of data being clustered, different affinity formulas can be used. In the example shown, a simple alphanumeric text list is being clustered. The "is just before" value is calculated by determining which character is different between the item and the next item. For example, the "is just before" value for "backup" is 0.67 because the next item is the word "bandwidth" and "backup" and "bandwidth" have the same first 2 characters and differ with respect to the third character.

Using the formula 1–(1/character position) results in a 0.67 value for the item "backup" and a 0.8 value for the item "back." The fourth column is the affinity value which is calculated as the inverse (1–"is just before" value). When breaking cluster sizes, the determination is made by either finding the lower "is just before" value for the item or the higher "affinity" value for the item. During the discussion of affinity used for breaking clusters in FIG. 4, the term "affinity" was loosely used for the "is just before" value of Table 2.

The fifth column is the "is just about equal to optimal size" value. To understand how this fuzzy value is determined, a fuzzy "shape" is applied to the data. In Table 2, the shape used is trapezoidal. Other shapes can be triangular and curvilinear (such as a beta curve or Gaussian curve). The sixth column is the "is less than or about equal to" the largest manageable cluster size value. This fuzzy value can be determined as a linear, or shoulder, value or as a sigmoid value.

Figure 6:
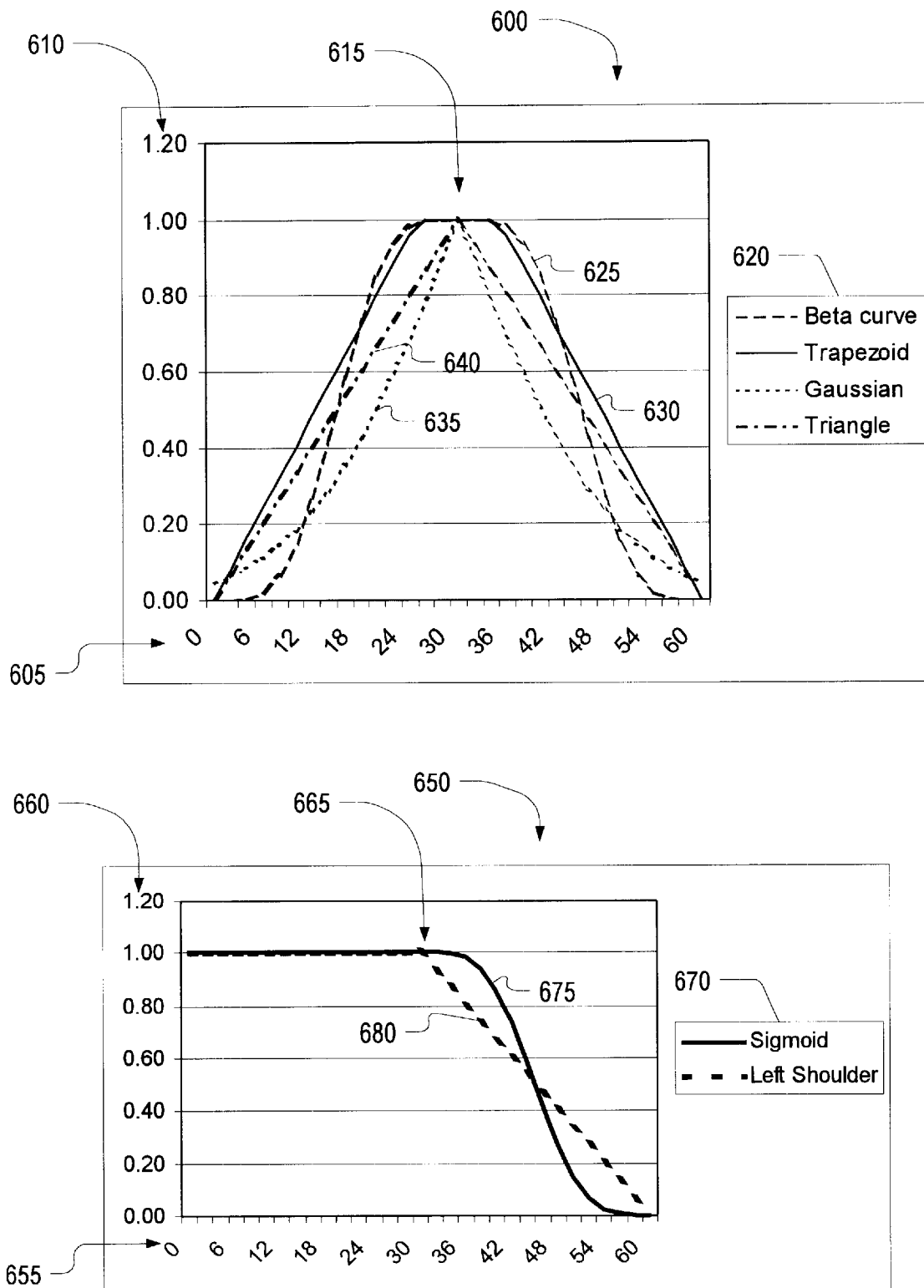
FIG. 6 includes two graphs showing various fuzzy logic functions used to compute optimal values and closeness to the largest manageable cluster size.

FIG. 6 shows two graphs. Graph 600 shows four fuzzy logic functions that can be used to determine optimal values such as those shown in column (5) in Table 2. X-axis 605 shows the cluster size for a cluster. Y-axis 610 shows the "is about equal to optimal size" value. Optimal size (615) for the data graphed in graph 600 is 30. Legend 620 shows the four types of fuzzy functions depicted in graph 600. Beta curve 625 is graphed as a curvilinear function with a maximum value of 30 (the optimal size). Trapezoidal function 630 is graphed with a range of 11 numbers (5 to each side of the true optimal value) being considered "optimal" values. As shown in FIG. 6, trapezoidal function 630 constantly increases to 1.0 when the cluster size is 25, remains at the optimal value until the cluster size is 35, and then constantly decreases until the optimal size value is zero. Gaussian function 635 is shown as another curvilinear function that begins with the optimal value being slightly greater than zero, increases to an optimal value go of one when the cluster size is 30, and then decreases until the optimal value is again slightly more than zero. Triangular function 640 is similar to the linear trapezoidal function except that instead of having a range of optimal values, as in the case of the trapezoidal function, the triangular function has the optimal value being at a point, the apex, of the triangular function, and constantly increases in value before the apex and, conversely, constantly decrease in value after the apex.

The optimal value scores shown in Table 2 use the trapezoidal function. The optimal value used in Table 2 is 25. The optimal range is then computed as being any cluster size from 20 through 30. These cluster sizes are each considered "close to" optimal. As the numbers fall away from the optimal range, the "close to" optimal value is computed by the formula 1–(distance from optimal range/20). The number 20 is used in the formula because that is the first number that falls within the optimal range.

Referring back to FIG. 6, the second graph 650 shows the functions for determining the "less than or about equal to" largest manageable cluster size when the largest manageable cluster size that can be handled by the client is 30 items. X-axis 655 shows the number of items in the cluster and y-axis 660 shows the "less than or about equal to largest manageable cluster size" value. Apex 665 shows the point at which the "less than or about equal to largest manageable cluster size" value begins to decrease. Legend 670 shows the line representations used for the two functions. Sigmoid function 675 is a curvilinear function that begins to decrease from apex 665 when the cluster size is 30 to approximately zero when the cluster size is 60. Left shoulder function 680 linearly decreases from apex 665 when the cluster size is 30 to zero when the cluster size is 60. The linear function for left shoulder function 680 can be described as: max–(distance from max/max) where max is the largest manageable cluster size. Because the largest manageable cluster size in Table 2 is 50 and only cluster items 1 through 50 are shown, all "less than or about equal to largest manageable cluster size" values (column 6) in Table 2 are equal to 1.0.

The seventh column in Table 2, Total Score is calculated by multiplying the affinity value (column 4), the "about equal to optimal size" value (column 5), and the "less than or about equal to largest manageable cluster size" value (column 6). The highlighted row (row 26) shows the item with the highest total score. This item ("anywhere") would be the last item in the cluster. The first item in the next cluster would be "API." Note that no other item in the cluster range has a higher affinity score than the breakpoint shown ("anywhere" has an affinity score of 0.5), therefore the processing of the flowchart in FIG. 5 would break the cluster with the last item being the $26^{th}$ item, or the word "anywhere." Because the affinity score is used in determining the total score, often times the item with the highest total score will also have the highest affinity score as shown in Table 2.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for clustering data wherein the data includes a plurality of items, said method comprising:
   obtaining requested cluster size data;
   calculating a score for each item; and
   determining a cluster size based upon the calculated score.

2. The method of claim 1, wherein the requested cluster size data includes an optimal cluster size and a largest manageable cluster size.

3. The method of claim 1, wherein the calculating a score for each item further comprises:
   calculating an affinity score for each item, the affinity score relating to the similarity of each item to an adjacent item in the data.

4. The method of claim 3, wherein the calculating a score for each item further comprises:
   calculating a fuzzy optimal score for each item, the fuzzy optimal score relating to an optimal cluster size usable by a client computer; and calculating a fuzzy maximum score for each item, the fuzzy maximum score relating to a largest manageable cluster size usable by a client computer.

5. The method of claim 4, wherein the calculating a score further comprises:
calculating a total score for each item, the total score determined as the product of the affinity score for the item, the fuzzy optimal score for the item, and the fuzzy maximum score for the item.

6. The method of claim 5, wherein the determining a cluster size includes selecting a last cluster item from the plurality of items wherein the last cluster item includes a largest total score.

7. The method of claim 6, wherein the determining a cluster size further comprises:
comparing the affinity score for the last cluster item with the affinity score for each item; and
selecting a new last cluster item, the last cluster item having a greater affinity score than the affinity score for the last cluster item.

8. The method of claim 1, wherein the obtaining further comprises:
connecting a server computer to a computer network; and
receiving at the server computer the requested cluster size data from a client computer.

9. An information handling system for clustering data wherein the data includes a plurality of items, said system comprising:
a computer, the computer including:
one or more processing units;
a memory operatively coupled to the one or more processing units; and
a nonvolatile storage area where the data is stored;
a program executable by the one or more processing units, the program including:
software code programmed to obtain requested cluster size data;
software code programmed to calculate a score for each item; and
software code programmed to determine a cluster size based upon the score for each item.

10. The information handling system of claim 9, wherein the requested cluster size data includes an optimal cluster size and a largest manageable cluster size.

11. The information handling system of claim 9, wherein the software code programmed to calculate a score for each item further comprises:
software code to calculate an affinity score for each item, the affinity score relating to the similarity of each item to an adjacent item in the data.

12. The information handling system of claim 11, wherein the software code programmed to calculate a score for each item further comprises:
software code to calculate a fuzzy optimal score for each item, the fuzzy optimal score relating to an optimal cluster size usable by a client computer; and
software code to calculate a fuzzy maximum score for each item, the fuzzy maximum score relating to a largest manageable cluster size usable by a client computer.

13. The information handling system of claim 12, wherein the software code to calculate a score further comprises:
software code to calculate a total score for each item, the total score determined as the product of the affinity score for the item, the fuzzy optimal score for the item, and the fuzzy maximum score for the item.

14. The information handling system of claim 13, wherein the software code to determine a cluster size includes software code to select a last cluster item from the plurality of items wherein the last cluster item includes a largest total score.

15. The information handling system of claim 14, wherein the software code to determine a cluster size further comprises:
software code to compare the affinity score for the last cluster item with the affinity score for each item; and
software code to select a new last cluster item, the last cluster item having a greater affinity score than the affinity score for the last cluster item.

16. The information handling system of claim 9, wherein the software code to obtain further comprises:
software code to connect the computer to a computer network; and
software code to receive at the server computer the requested cluster size data from a client computer.

17. A computer operable medium for clustering data wherein the data includes a plurality of items, said medium comprising:
means for obtaining requested cluster size data;
means for calculating a score for each item; and
means for determining a cluster size based upon the calculating.

18. The computer operable medium of claim 17, wherein the requested cluster size data includes an optimal cluster size and a largest manageable cluster size.

19. The computer operable medium of claim 17, wherein the means for calculating a score for each item further comprises:
means for calculating an affinity score for each item, the affinity score relating to the similarity of each item to an adjacent item in the data.

20. The computer operable medium of claim 19, wherein the means for calculating a score for each item further comprises:
means for calculating a fuzzy optimal score for each item, the fuzzy optimal score relating to an optimal cluster size usable by a client computer; and
means for calculating a fuzzy maximum score for each item, the fuzzy maximum score relating to a largest manageable cluster size usable by a client computer.

21. The computer operable medium of claim 20, wherein the means for calculating a score further comprises:
means for calculating a total score for each item, the total score determined as the product of the affinity score for the item, the fuzzy optimal score for the item, and the fuzzy maximum score for the item.

22. The computer operable medium of claim 21, wherein the means for determining a cluster size includes means for selecting a last cluster item from the plurality of items wherein the last cluster item includes a largest total score.

23. The computer operable medium of claim 22, wherein the means for determining a cluster size further comprises:
means for comparing the affinity score for the last cluster item with the affinity score for each item; and
means for selecting a new last cluster item, the last cluster item having a greater affinity score than the affinity score for the last cluster item.

24. The computer operable medium of claim 17, wherein the means for obtaining further comprises:
means for connecting a server computer to a computer network; and
means for receiving at the server computer the requested cluster size data from a client computer.

* * * * *